(12) United States Patent
Andersen et al.

(10) Patent No.: US 8,910,650 B2
(45) Date of Patent: Dec. 16, 2014

(54) METHOD FOR OPERATING A VALVE

(75) Inventors: Jens Folkmar Andersen, Fredericia (DK); Karsten Schack Madsen, Odense C (DK); Kenneth Rehhoff, Odense C (DK)

(73) Assignee: Alfa Laval Kolding A/S, Kolding (DK)

( * ) Notice: Subject to any disclaimer, the term of this patent is extended or adjusted under 35 U.S.C. 154(b) by 879 days.

(21) Appl. No.: 12/738,102

(22) PCT Filed: Aug. 8, 2008

(86) PCT No.: PCT/EP2008/006545
§ 371 (c)(1),
(2), (4) Date: Jul. 15, 2010

(87) PCT Pub. No.: WO2009/049705
PCT Pub. Date: Apr. 23, 2009

(65) Prior Publication Data
US 2010/0276004 A1    Nov. 4, 2010

(30) Foreign Application Priority Data

Oct. 19, 2007  (DE) .......................... 10 2007 050 086

(51) Int. Cl.
*B08B 3/00* (2006.01)
*F16K 31/04* (2006.01)
*F16K 1/54* (2006.01)

(52) U.S. Cl.
CPC ................. *F16K 1/54* (2013.01); *F16K 31/046* (2013.01)
USPC .......................... 137/15.06; 137/240; 251/215

(58) Field of Classification Search
CPC ........ F16K 31/046; F16K 1/446; F16K 25/02
USPC ................... 137/15.04–15.06, 240; 251/63.5, 251/226–227, 215
See application file for complete search history.

(56) References Cited

U.S. PATENT DOCUMENTS 1,682,248 A * 8/1928 Reid et al. ...................... 251/220
1,738,437 A * 12/1929 Langdon ........................ 251/215
(Continued)

FOREIGN PATENT DOCUMENTS

CN    1073783 A    6/1993
CN    1482381 A    3/2004
(Continued)

OTHER PUBLICATIONS

Raw Machine Translation of EP1669648 (Bernard). Bernard was published on Jun. 14, 2006.*

(Continued)

*Primary Examiner* — John K Fristoe, Jr.
*Assistant Examiner* — David Colon Morales
(74) *Attorney, Agent, or Firm* — Buchanan Ingersoll & Rooney PC (57) ABSTRACT

A method for process optimization for a valve (1) comprising a valve seat (5) arranged in a valve housing (3) between an inlet (7) and an outlet (8), comprising a valve disk (4) which is connected to an actuating rod (10) and comprising an actuating device (2) which acts on the actuating rod (10), by which means the valve disk (4) is brought into a closed position (23) for closing the valve (1) and is pressed onto the valve seat (5) and for opening the valve (1) is raised from the valve seat (5) and brought into an opening position (26), wherein fluid flows through the valve (1) for carrying out the method in the course of cleaning, can be improved with regard to a better cleaning effect in remote regions (14, 15, 16) of the interior (17) of the valve housing (3) whereby during cleaning the valve disk (4) is brought into at least one intermediate position (24, 24, 31) between the closed position (23) and the open position (26).

22 Claims, 5 Drawing Sheets

(56) References Cited

U.S. PATENT DOCUMENTS

| | | | | |
|---|---|---|---|---|
| 1,872,632 | A * | 8/1932 | Brindley | 251/223 |
| 2,478,197 | A * | 8/1949 | Kleiss | 251/214 |
| 4,344,453 | A * | 8/1982 | Tuchenhagen et al. | 137/240 |
| 4,605,035 | A * | 8/1986 | Rasmussen et al. | 137/240 |
| 4,687,015 | A * | 8/1987 | Mieth | 137/238 |
| 4,816,987 | A * | 3/1989 | Brooks et al. | 700/45 |
| 4,969,598 | A * | 11/1990 | Garris | 236/12.12 |
| 4,991,619 | A * | 2/1991 | della Porta | 137/240 |
| 5,333,833 | A * | 8/1994 | Reinicke | 251/77 |
| 5,575,305 | A * | 11/1996 | Mieth | 137/15.04 |
| 6,050,296 | A * | 4/2000 | Hoffmann et al. | 137/552 |
| 6,178,986 | B1 * | 1/2001 | Burmester | 137/240 |
| 6,213,450 | B1 * | 4/2001 | Palmer | 251/170 |
| 6,510,769 | B1 * | 1/2003 | Kalinsky | 82/47 |
| 6,631,882 | B2 * | 10/2003 | Mack | 251/129.04 |
| 2004/0011404 | A1 * | 1/2004 | Ku et al. | 137/341 |
| 2005/0229969 | A1 * | 10/2005 | Nguyen et al. | 137/240 |
| 2006/0021656 | A1 * | 2/2006 | Kajitani et al. | 137/487.5 |
| 2006/0108550 | A1 * | 5/2006 | Burmester | 251/62 |
| 2006/0162780 | A1 * | 7/2006 | Matsuura | 137/240 |

FOREIGN PATENT DOCUMENTS

| | | |
|---|---|---|
| EP | 0 174 384 | 3/1986 |
| EP | 1 669 648 | 6/2006 |
| WO | WO 2007/061519 | 5/2007 |

OTHER PUBLICATIONS

Office Action for Chinese Application No. 200880111879.X. dated Sep. 15, 2011 in English only.
Form PCT/ISA/210 Written Opinion of the International Searching Authority (Dec. 29, 2008).
Office Action issued May 16, 2012 in CN Application 200880111879.X (with English translation).
English translation of Office Action issued by Chinese Patent Office on Jan. 30, 2013 in corresponding Chinese Patent Application 200880111879.

* cited by examiner

METHOD FOR OPERATING A VALVE

The invention relates to a method for process optimisation for a valve, by which the cleaning, product treatment, cavitation, water hammering etc. can be optimised, the valve comprising a valve seat arranged in a valve housing between an inlet and an outlet, comprising a valve disk which is connected to an actuating rod and comprising an actuating device which acts on the actuating rod, by which means the valve disk is brought into a closed position for closing the valve and is pressed onto the valve seat and for opening the valve is raised from the valve seat and brought into an opening position. In this case, cleaning fluid flows through the valve for carrying out the method in the course of cleaning.

A valve arrangement suitable for carrying out the generic method is known from WO 2007/061519 A1. During cleaning the cleaning fluid flows via an inlet and outlet through the interior of the valve housing. In this case, there are regions of the interior through which cleaning fluid only flows incompletely, which has a negative influence on the cleaning effect. In order to reduce the cleaning time and improve the cleaning effect, structures are therefore provided in the known device which serve as vortex generators during circulation of the cleaning fluid so that the cleaning fluid is highly vortexed in the interior of the valve and consequently even the remotest corners of the valve interior to be cleaned are freed from contaminants. However, the structures serving as vortex generators have the disadvantage that they also generate vortices during normal operation of the valve and thereby at least partially hinder free through-flow and produce friction losses.

It is the object of the invention to provide a method for process optimisation for a valve which substantially allows process conditions like the cleaning effect to be improved without additional manufacturing effort.

The solution according to the invention provides that during cleaning or product treatment the valve disk is brought into at least one intermediate position between the closed position and the open position. In such an intermediate position the valve disk impedes the free flow of fluid so that this is substantially more strongly vortexed than if the valve disk were in its open position. Modern valves are designed so that in its open position the valve disk opposes the free flow of fluid through the valve with the lowest possible resistance. At the same time however, in such designs this is also the reason why some end regions of the valve interior through which the main flow of fluid does not flow directly cannot be sufficiently freed from dirt during cleaning of the valve. As a result of the intermediate position of the valve disk according to the invention, vortices of the cleaning fluid generated at the valve disk can also be guided into the rearmost corners of the valve interior where the adhering contaminants can be effectively flushed away.

The flushing effect can be further improved by the measure whereby the valve disk is not simply brought into any intermediate position but is brought into an intermediate position in which the cleaning fluid flowing through the valve is particularly strongly vortexed.

In special configurations of the valve interior, a certain position of the valve disk can possibly be optimum for a first region of the interior, but possibly not for a second region of the interior for which a different intermediate position of the valve disk would result in better cleaning results. In a further development of the method according to the invention, it is therefore provided that one or more intermediate positions of the valve disk are specified in which the vortexing of the cleaning fluid is at least sufficiently good in at least one inner valve region and that during subsequent cleaning processes the valve disk is successively brought into the intermediate positions thus specified. In this way, several valve inner regions can be optimally cleaned.

A further improvement of the method consists in that the valve disk is brought into an intermediate position in the vicinity of the valve seat so that the flow rate of the cleaning fluid is increased as a result of the constricted flow opening. For a given flow volume per unit time a substantial increase in the flow rate can be achieved by narrowing the flow cross-section. An increased flow rate in turn normally results in stronger vortexing of the fluid at obstacles. The stronger vortexing generally results in better cleaning results.

Since different positions of the valve disk can result in different effects on different regions of the valve interior during narrowing of the flow opening, in a further development of the method it is proposed that one or more intermediate positions of the valve disk are specified in which the flow rate of the cleaning fluid is at least sufficiently high to improve the cleaning effect and that during subsequent cleaning processes the valve disk is successively brought into the positions thus specified.

Additional vortexing of the cleaning fluid and improvement of the cleaning effects is achieved by the measure whereby the valve disk is rotated during cleaning of the valve.

The invention also comprises an actuating device for a valve for carrying out the method according to the invention comprising an actuating motor and a control unit, wherein by control signals of the control unit the valve disk can be brought by means of the actuating motor into a closed position, an open position and into intermediate positions which can be freely specified. In known actuating devices a pneumatic motor is usually provided which can bring the valve disk either into the closed position or into the open position. In contrast to this, the actuating device according to the invention can also bring the valve disk into any intermediate position.

The control unit advantageously comprises a programmable microprocessor and the methods according to the invention for operating the valve can be specified and controlled. The parameters for the respective intermediate positions of the valve disk to be set and their time sequence can thus be specified in a simple manner by programming. In normal operation the software then controls the actuating motor of the actuating device fully automatically by means of the microprocessor. If the actuating motor can execute a rotation of the valve disk in addition to a translational movement or a second motor is provided for rotation of the valve disk, the rotation can contribute to further vortexing of the cleaning fluid and therefore improve the cleaning effect.

The actuating device according to the invention can also be used for improved sequence control of the opening and closing process of a valve, whereby during opening and/or closing of the valve the valve disk is moved considerably more slowly by the actuating device in the immediate vicinity of the closed position than in regions of the actuating path remote from the closed position. In this way, a valve is obtained which only requires a relatively short time for the entire closing or opening process but in which the end of the closing process or the beginning of the opening process does not take place abruptly but gently. This avoids "hammer" in the liquid columns in the inlet and/or outlet which could otherwise cause permanent damage to the valve or other parts of the system.

An exemplary embodiment is explained in detail hereinafter with reference to the drawings. The figures in the drawings show in detail.

Figure 1:
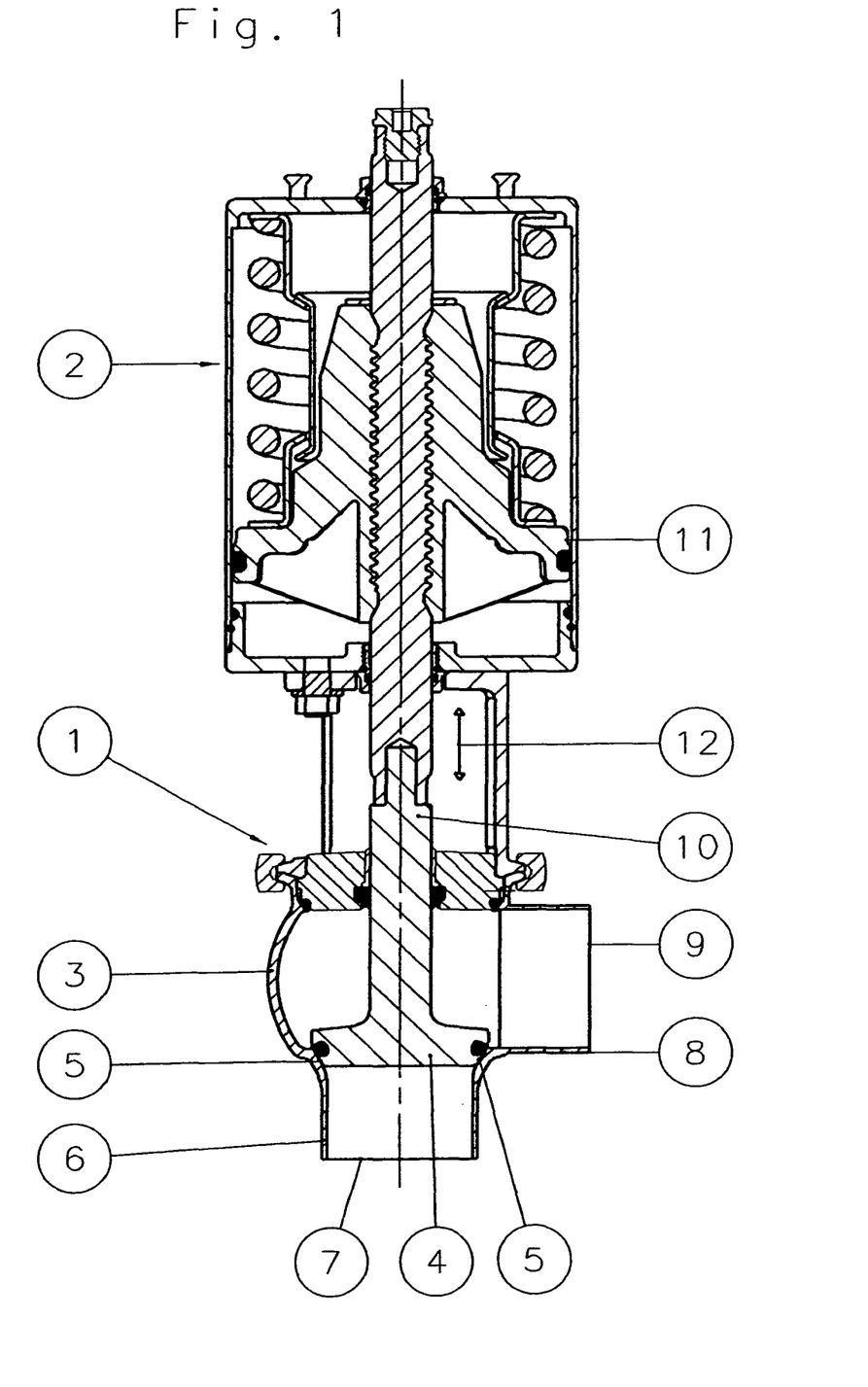
FIG. 1: a valve with a pneumatic motor in the closed position.

The valve arrangement shown in FIG. 1 substantially consists of a valve 1 and an actuating device 2. The valve 1 has a valve housing 3 and a valve disk 4 which is pressed against a valve seat 5 in the closed position shown in FIG. 1. A pipe connection 6 forms the inlet 7 of the valve into which a fluid flows into the valve. A pipe connection 8 disposed at right angles to the pipe connection 6 serves as the outlet 9 from which the fluid emerges. In the closed state of the valve shown in FIG. 1, no fluid can pass from the inlet 7 to the outlet 9.

The valve disk 4 is connected to an actuating rod 10 which for its part is operatively connected to a pneumatic motor 11 of the actuating device 2. The actuating rod 10 and with this the valve disk 4 can be moved up and down in the direction of the arrow 12 by means of the motor 11. As a result of the downward movement, as shown in FIG. 1, the valve disk 4 is pressed against the valve seat 5 and the flow through the valve 1 is thereby shut off. For opening the valve, the valve disk 4 is lifted upwards by the motor 11 and by means of the actuating rod 10 until it reaches its open position shown in FIG. 2. Now, the fluid under pressure at the inlet 7 can pass through the opening formed at the valve seat 5 and emerge at the outlet 9 after passing through the valve housing 3. The main flow 13 of liquid is indicated by a thick arrow in FIG. 2. However, the liquid fills the entire interior 17 of the valve but the same flow conditions do not prevail in every region of the interior 17. In particular, the flow rate is very low in the regions 14, 15 and 16 indicated in FIG. 2.

When the valve 1 is to be cleaned, cleaning fluid flows through it, in particular according to the main flow 13. As a result of the low flow rate of the cleaning fluid in regions 14, 15, 16 with the valve disk 4 located in the open position (FIG. 2), the cleaning effect in regions 14, 15, 16 is substantially reduced. This means that the cleaning process must be very extended in time in order to achieve satisfactory cleaning effects.

Figure 2:
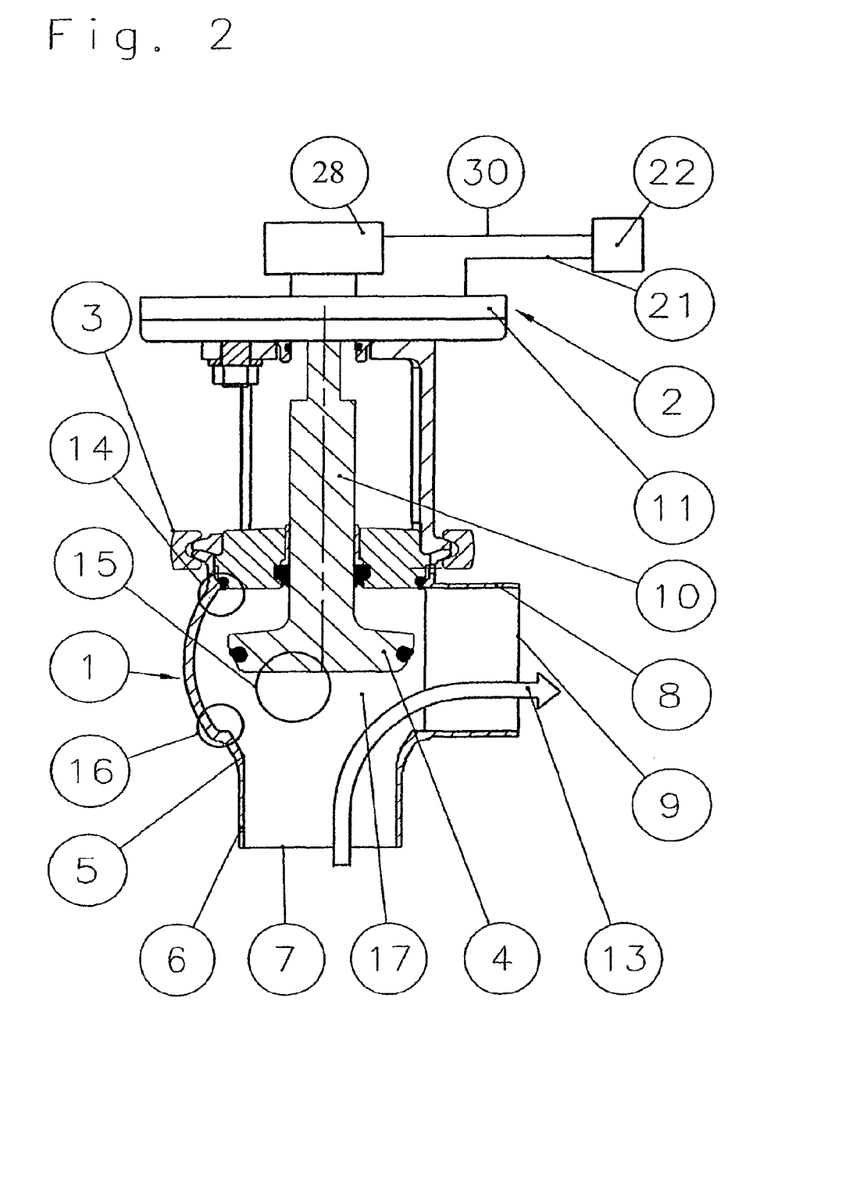
FIG. 2: a partial view of the same valve in the open position.
Figure 3:
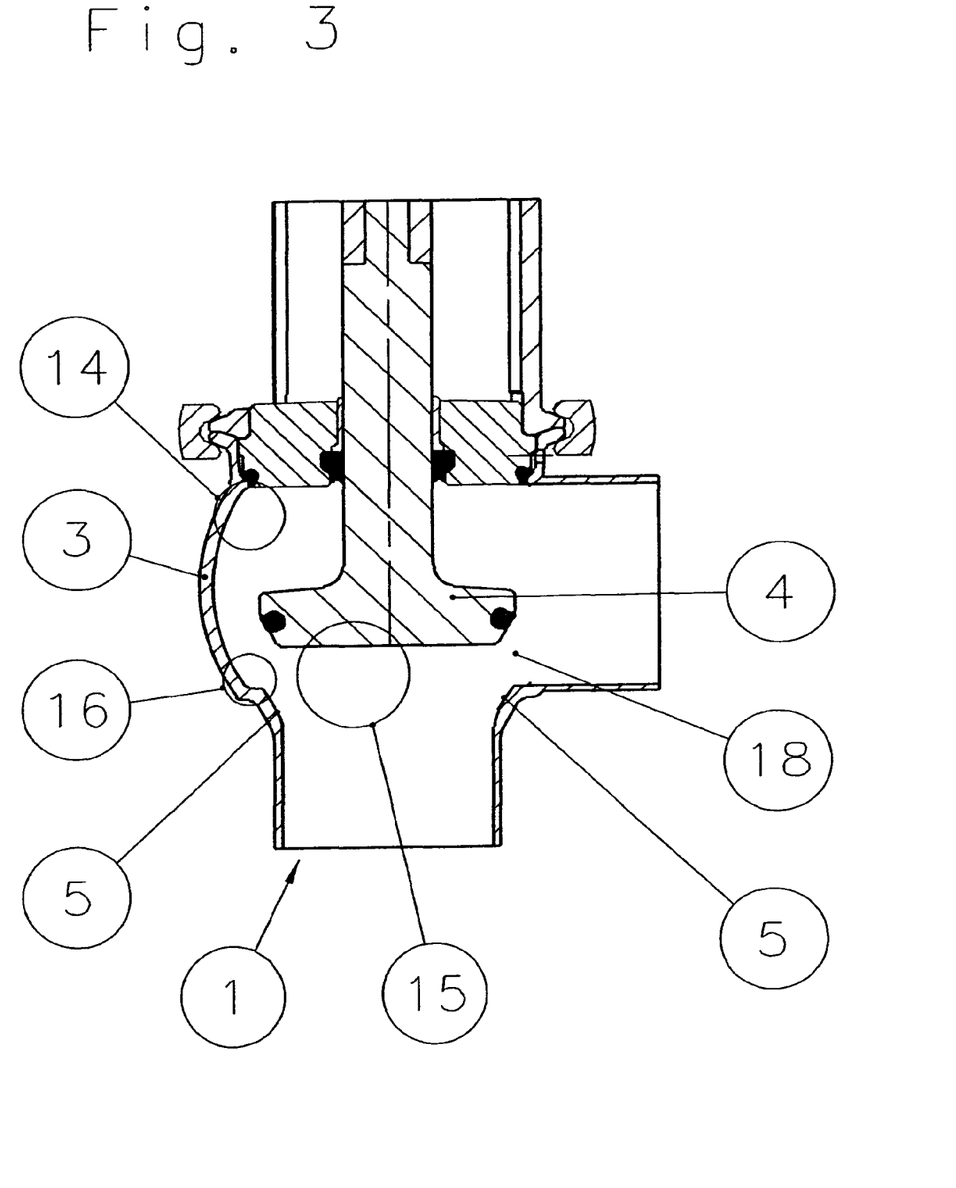
FIG. 3: a partial view of the same valve in a first intermediate position.

However, the invention now provides that the valve disk 4 is moved by means of the motor 11 from the open position shown in FIG. 2 in the direction of closure until it occupies the intermediate position shown in FIG. 3. In the intermediate position in FIG. 3, the distance 18 between the valve disk 4 and the valve seat 5 is shorter than in the open position. This results in changed flow conditions for the cleaning fluid with the consequence that in regions 14, 15, 16 a higher flow rate of the cleaning fluid and therefore a better cleaning effect is achieved. The precise position of the intermediate position or the displacement path required for this in the direction of the arrow 12 can be determined, for example, by tests in which either the cleaning effect or the flow rate of the fluid are determined as a function of the position of the valve disk 4.

Figure 4:
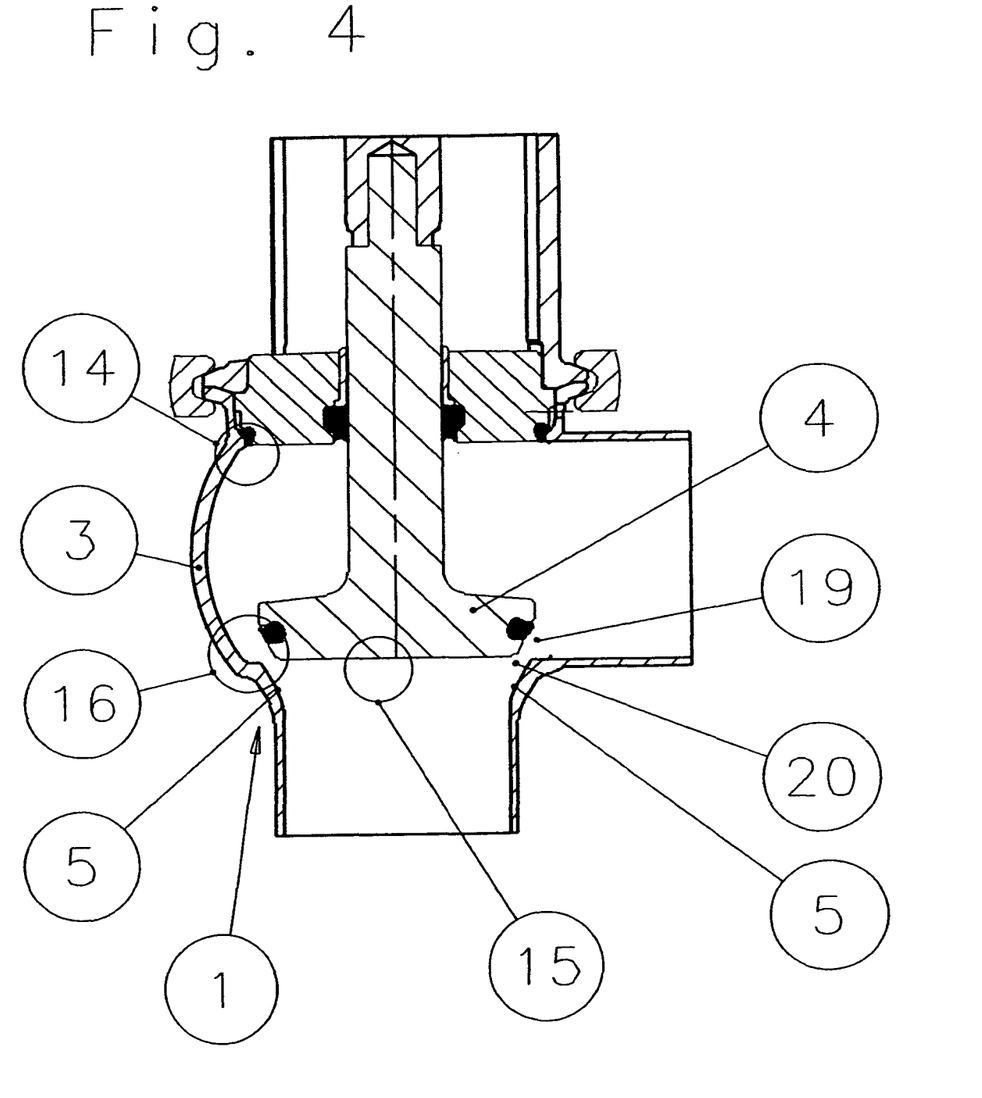
FIG. 4; as FIG. 3 in a second intermediate position.

FIG. 4 shows the same valve 1 but in this case, the valve disk 4 is located in a different intermediate position in which only a very short distance 19 remains between the valve disk 4 and the valve seat 5. The distance 19 defines an annular flow opening 20 running around the valve disk 4 within which a substantially increased flow rate of the cleaning fluid must occur as a result of the small cross-section of the flow opening 20.

As a result of this increased flow rate, the flow rate of the cleaning fluid in regions 14, 15, 16 is again altered and the cleaning effect is optionally improved. With such narrow distances 19, the optimum position of the valve disk 4 in the respective intermediate position must also be determined by tests in which the cleaning effect can be determined in the critical regions 14, 15, 16 as a function of the intermediate position.

As can be seen in the schematic diagram in FIG. 2, the motor 11 is connected to a control unit 22 by means of a control line 21. The control unit comprises a programmable microprocessor so that the motor 11 can be controlled by means of software running in the control unit 22 in order to bring the valve disk 4 into arbitrary positions by means of the actuating rod 10, in particular, into the closed position shown in FIG. 1, the open position shown in FIG. 2 and the various intermediate positions shown in FIGS. 3 and 4.

Figure 5:
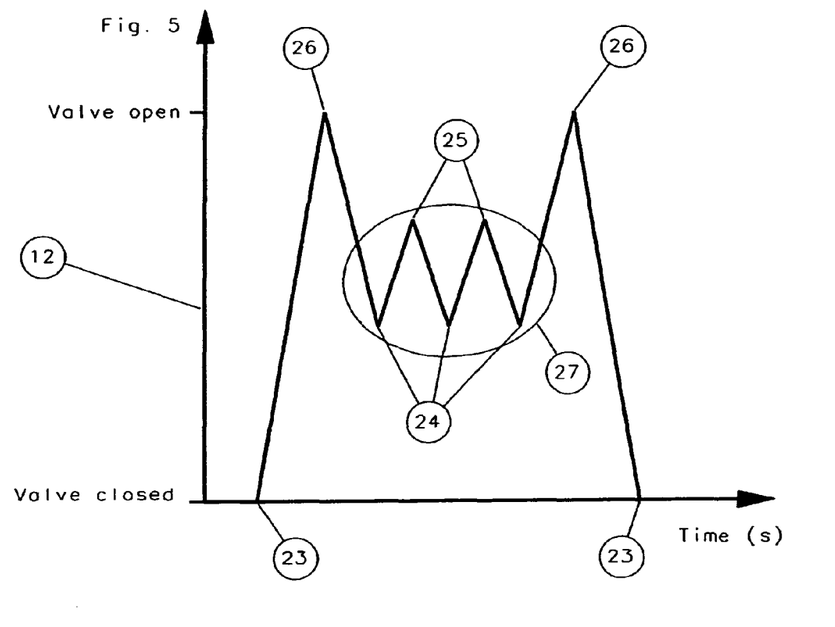
FIG. 5: a diagram of the actuating path of the valve disk during cleaning of the valve plotted versus time.

FIG. 5 shows a diagram in which the actuating path (corresponding to the direction of the arrow 12 in FIG. 1) of the valve disk 4 and the actuating rod 10 is plotted as a function of time during a cleaning cycle. It begins with the closed position 23 from which the valve disk 4 is initially brought into the open position 26. Now the cleaning fluid can flow through the fully open valve and clean a large part of the interior 17. In a next step the valve disk 4 is brought from the open position 26 into a first intermediate position 24. In this case, the flow conditions change and some regions, for example, regions 14, 15, 16 of the interior 17 of the valve 1 are now more effectively cleaned than when the valve 1 is fully open. In a next step, the valve disk 4 moves from the first intermediate position 24 into a second intermediate position 25. In this case, the flow conditions change again, resulting in a better cleaning effect in other regions of the interior 17 of the valve 1. This is followed by multiple changing in which the valve disk 4 is moved from an intermediate position 25 into the other intermediate position 24 and back. Towards the end of the cleaning procedure, the valve disk 4 is again brought into the open position 26, which can be expedient, for example, for flushing out the cleaning fluid. At the end the valve disk 4 is again moved into the closed position 23, thus concluding the cleaning process. The entire sequence control of the motor 11 and therefore of the positions 23 to 26 of the valve disk 4 is accomplished by the software in the microprocessor of the control unit 22. The section 27 of the process sequence important for the invention is shown in FIG. 4.

A further improvement in the process sequence can be achieved by means of a second motor 28 shown schematically in FIG. 2 by which means the actuating rod 10 and therefore the valve disk 4 can be set in rotation. The second motor 28 is connected to the control unit 22 via a control line 30. The rotation can therefore be controlled by the control unit 22 by means of software in exactly the same way as the translation according to arrow 12 in FIG. 1.

Figure 6:
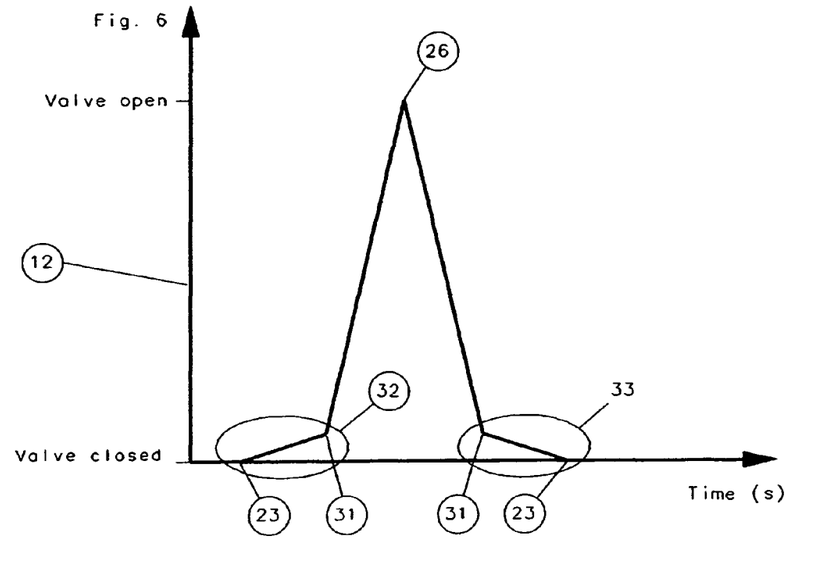
FIG. 6: a diagram of the actuating path of the valve disk during normal opening and closing, plotted versus time.

Another sequence control for opening and closing the valve 1 is shown in the diagram in FIG. 6. In this case, the displacement path of the valve disk 4 and the actuating rod 10 according to the direction of the arrow 12 in FIG. 1 is plotted versus time. The sequence begins in the closed position 23 of the valve disk 4. For opening the valve 1 the valve disk 4 is initially moved at slow speed into an intermediate position 31 and then displaced at high speed (greater slope) as far as the open position 26. During closing of the valve the valve disk 4 is initially displaced from the open position 26 at high speed into the intermediate position 31 before then being brought into the closed position 23 at lower speed. The essential sections 32, 33 of the process are marked in FIG. 6. In practice, this sequence means that the valve disk 4 is generally moved rapidly during opening and closing but in sections 32 and 33, i.e., when it is located very close to the closed position 23, it is moved at significantly slower speed. This avoids "hammer" at the inlet 7 or outlet 9 of water columns in communication with the valve disk 4. If the valve disk 4 were to be moved at full speed into the closed position 23 or from this position, this "hammer" in the water columns would occur and could possibly result in damage to the system in which the valve 1 is mounted.

REFERENCE LIST

1 Valve
2 Actuating device
3 Valve housing
4 Valve disk
5 Valve seat
6 Connecting pipe
7 Inlet
8 Connecting pipe
9 Outlet
10 Actuating rod
11 Pneumatic motor
12 Direction of arrow
13 Main flow
14 Region
15 Region
16 Region
17 Interior
18 Distance
19 Distance
20 Flow opening
21 Control line
22 Control unit
23 Closed position
24 First intermediate position
25 Second intermediate position
26 Opening position
27 Section
28 Second motor
30 Control line
31 Further intermediate position
32 Section
33 Section

What is claimed is:

1. A method for operating a valve having a valve seat arranged in a valve housing between an inlet and an outlet, having a valve disk connected to an actuating rod and having an actuating device which acts on the actuating rod, whereby the valve disk is brought into a closed position for closing the valve by pressing the valve disk against the valve seat, and for opening the valve the valve disk is raised from the valve seat and brought into an open position, wherein during cleaning of the valve, while cleaning fluid flows through the valve from the inlet to the outlet, the valve disk: (i) moves from the open position to a first intermediate position between the closed position and the open position, (ii) stops at the first intermediate position, and (iii) either moves from the first intermediate position to a second intermediate position between the closed position and the open position or rotates.

2. The method according to claim 1, wherein the actuating device which acts on the actuating rod can move the valve disk at different speeds between the closed position and the open position.

3. The method according to claim 1, wherein the valve disk is rotated during cleaning of the valve.

4. The method of claim 1, further comprising moving the valve disk back and forth between the first intermediate position and the second intermediate position a plurality of times.

5. The method of claim 1, wherein the valve disk is moved to the first intermediate position after the cleaning fluid begins to flow through the valve.

6. The method according to claim 1, wherein the valve disk is brought into an intermediate position in which the cleaning fluid flowing through the valve is vortexed.

7. The method according to claim 6, wherein one or more intermediate positions of the valve disk are specified in which the vortexing of the cleaning fluid occurs in at least one inner valve region and wherein during subsequent cleaning processes the valve disk is successively brought into the intermediate positions thus specified.

8. The method according to claim 1, wherein the valve disk is brought into an intermediate position in the vicinity of the valve seat so that the flow rate of the cleaning fluid is increased as a result of a constricted flow opening.

9. The method according to claim 8, wherein one or more intermediate positions of the valve disk are specified in which the flow rate of the cleaning fluid improves the cleaning effect and wherein during subsequent cleaning processes the valve disk is successively brought into the positions thus specified.

10. An actuating device for a valve having a valve seat arranged in a valve housing enclosing a space for a cleaning fluid to flow between an inlet and an outlet and having a valve disk connected to an actuating rod, wherein the actuating device acts on the actuating rod, and wherein the valve is further provided with a control unit, the actuating device comprising an actuating motor configured to move the valve disk into at least a closed position at which the cleaning fluid in the space is prevented from flowing out of the outlet, an open position in which the cleaning fluid is permitted to flow through the outlet, and a first intermediate position between the closed position and the open position, the control unit controls the actuating motor to: (i) move the valve disk in a first direction toward the first intermediate position while the cleaning fluid flows through the valve housing between the inlet and the outlet, and (ii) stop movement of the valve disk in the first direction when the valve disk reaches the first intermediate position while the cleaning fluid flows through the valve housing between the inlet and the outlet.

11. The actuating device of claim 10, wherein the control unit is configured to move the valve disk back and forth between the first intermediate position and a second intermediate position between the closed position and the open position a plurality of times.

12. The actuating device of claim 10, wherein while the cleaning fluid flows through the valve housing between the inlet and the outlet, the control unit controls the actuating motor to move the valve disk back and forth a plurality of times directly between the first intermediate position and a second intermediate position located between the closed position and the open position.

13. The actuating device according to claim 10, wherein the control unit comprises a programmable microprocessor and methods for operating the valve can be specified and controlled by software.

14. The actuating device according to claim 13, wherein the actuating motor is configured to be controlled by the control unit to move the valve disk, in a second direction opposite to the first direction, from the first intermediate position to at least a second intermediate position between the closed position and the open position.

15. The actuating device according to claim 14, wherein the actuating motor can move the valve disk at different speeds between the closed position and the open position.

16. The actuating device according to claim 13 or 14, wherein the actuating motor can execute a rotation of the valve disk in addition to a translational movement or wherein a second motor is provided for rotation of the valve disk.

17. The actuating device according to claim 16, wherein the actuating motor can move the valve disk at different speeds between the closed position and the open position.

18. A cleaning method for a valve including a valve housing possessing an inlet and an outlet, a valve seat positioned between the inlet and the outlet, a valve disk configured to close the valve by pressing against the valve seat in a closed position and open the valve by moving away from the valve seat to an open position, an actuating rod connected to the valve disk, an actuating device configured to move the valve disk with the actuating rod to the closed position, the open position, a first intermediate position between the closed position and the open position and a second intermediate position between the closed position and the open position, the cleaning method comprising:
    moving the valve disk to the open position;
    pumping a cleaning fluid through the valve from the inlet to the outlet;
    moving the valve disk from the open position to the first intermediate position while the cleaning fluid is pumped through the valve;
    stopping the valve disk at the first intermediate position; and
    moving the valve disk from the first intermediate position to the second intermediate position while the cleaning fluid is pumped through the valve.

19. The cleaning method of claim 18, further comprising rotating the valve disk.

20. The cleaning method of claim 18, further comprising moving the valve disk from the second intermediate position to the first intermediate position while the cleaning fluid is pumped through the valve.

21. The cleaning method of claim 18, further comprising moving the valve disk back and forth between the first intermediate position and the second intermediate position a plurality of times.

22. The method of claim 18, wherein the valve disk is moved from the open position to the first intermediate position after the cleaning fluid begins to flow through the valve.

* * * * *